United States Patent [19]

Hulette et al.

[11] 3,756,369
[45] Sept. 4, 1973

[54] APPARATUS FOR STACKING AND RECLAIMING BULK MATERIAL

[75] Inventors: Roger Leon Hulette, Berea; Robert J. Stupp, Westlake, both of Ohio

[73] Assignee: McDowell-Wellman Engineering Company, Cleveland, Ohio

[22] Filed: Oct. 21, 1971

[21] Appl. No.: 191,511

[52] U.S. Cl. ................................ 198/36, 198/109
[51] Int. Cl. ............................................. B65g 65/28
[58] Field of Search ...................... 198/36, 109, 229

[56] References Cited
UNITED STATES PATENTS

| | | | |
|---|---|---|---|
| 502,151 | 7/1893 | Vollhering et al. | 198/109 |
| 3,596,748 | 8/1971 | Fischer | 198/36 |
| 3,618,744 | 11/1971 | Hulette | 198/36 |
| 3,670,870 | 6/1972 | Cheek | 198/36 |

Primary Examiner—Richard E. Aegerter
Assistant Examiner—Joseph E. Valenza
Attorney—Harold F. McNenny, Robert A. Sturges et al.

[57] ABSTRACT

There is provided an apparatus useful for handling bulk material and characterized by a four-link boom movable in a vertical plane and constructed and adapted both to reclaim and to stack bulk material. It also includes an endless conveyor belt having outwardly projecting flights secured thereto at spaced intervals for continuous coursing along the outer periphery defined by the four links.

14 Claims, 7 Drawing Figures

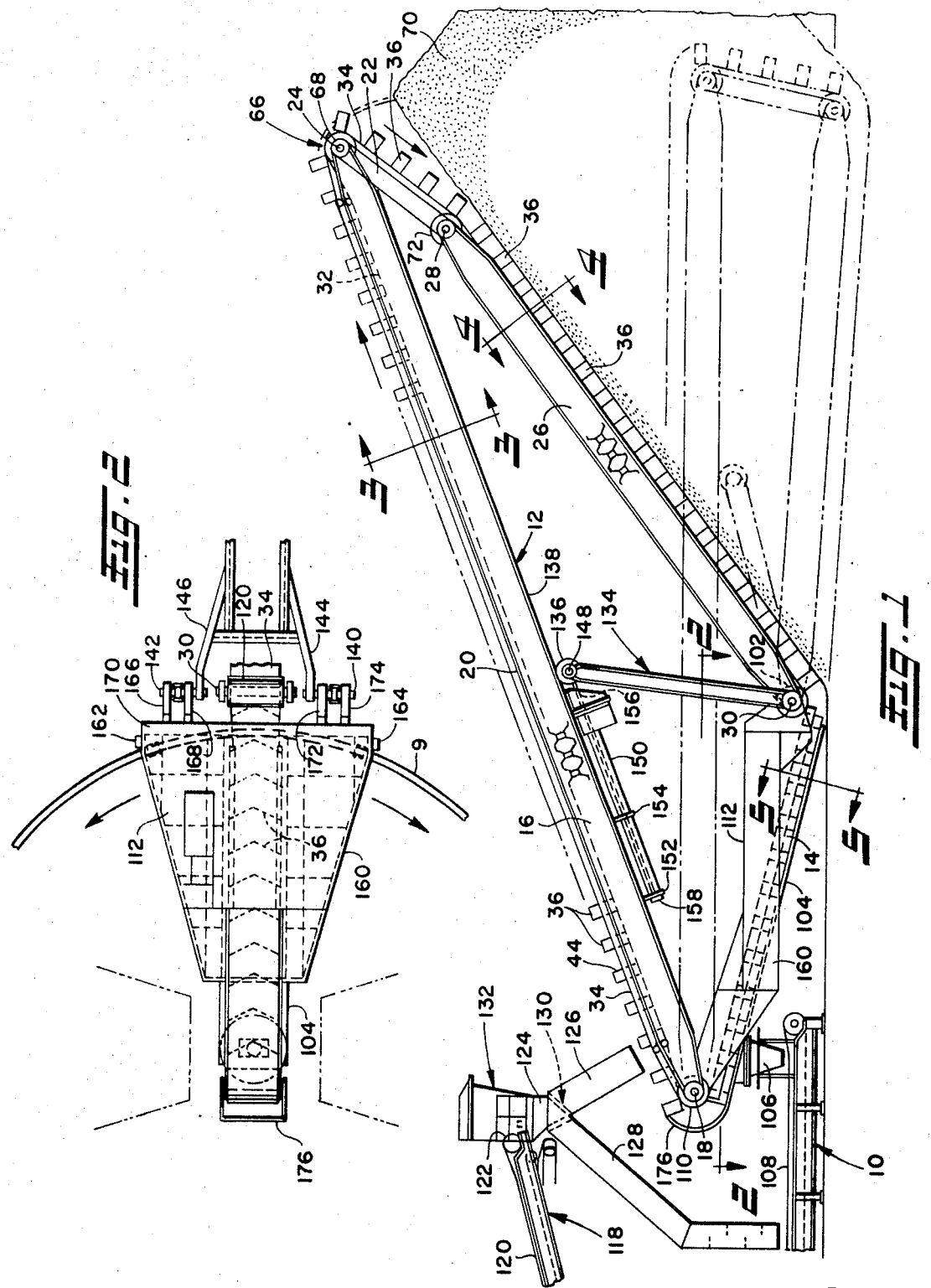

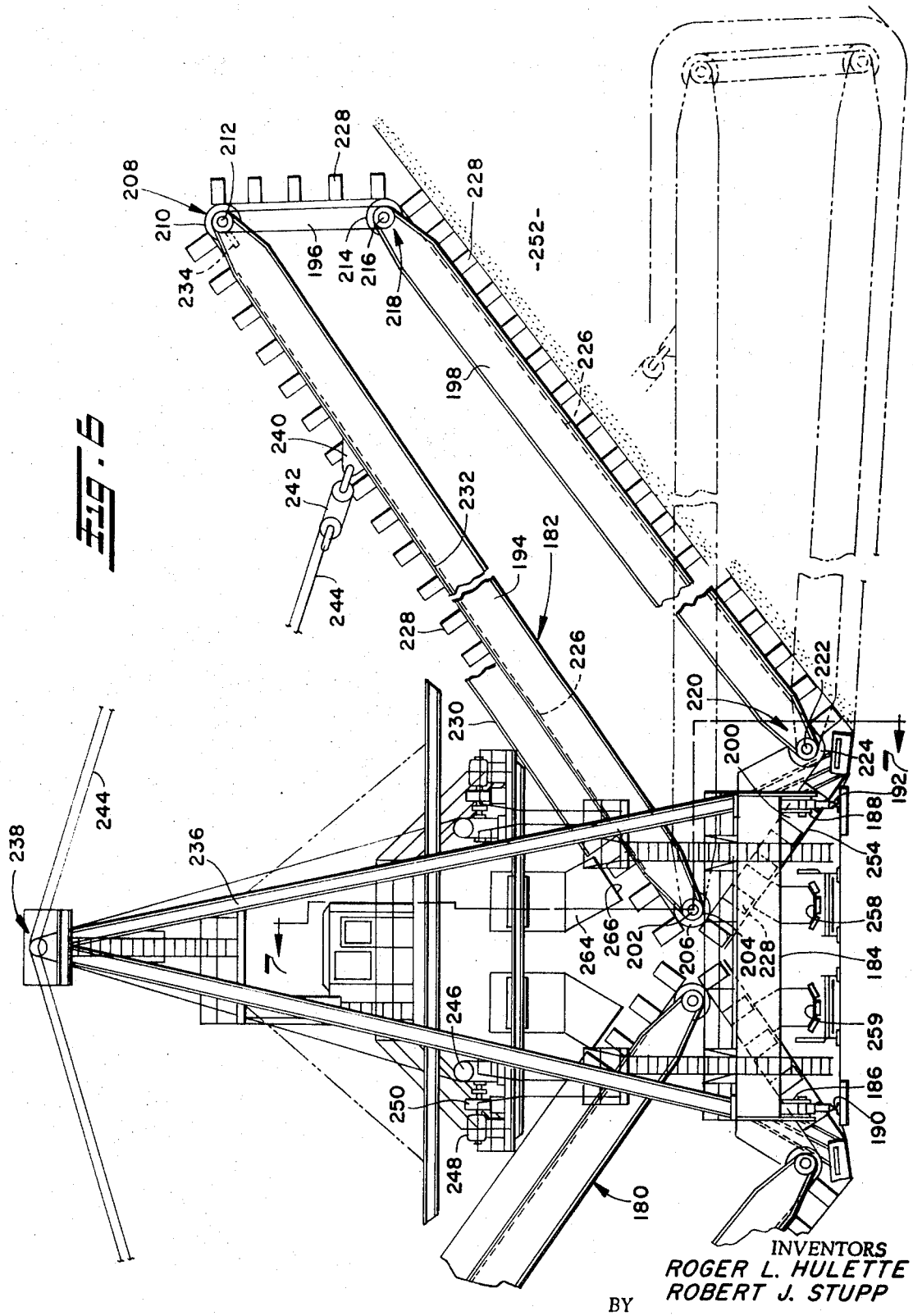

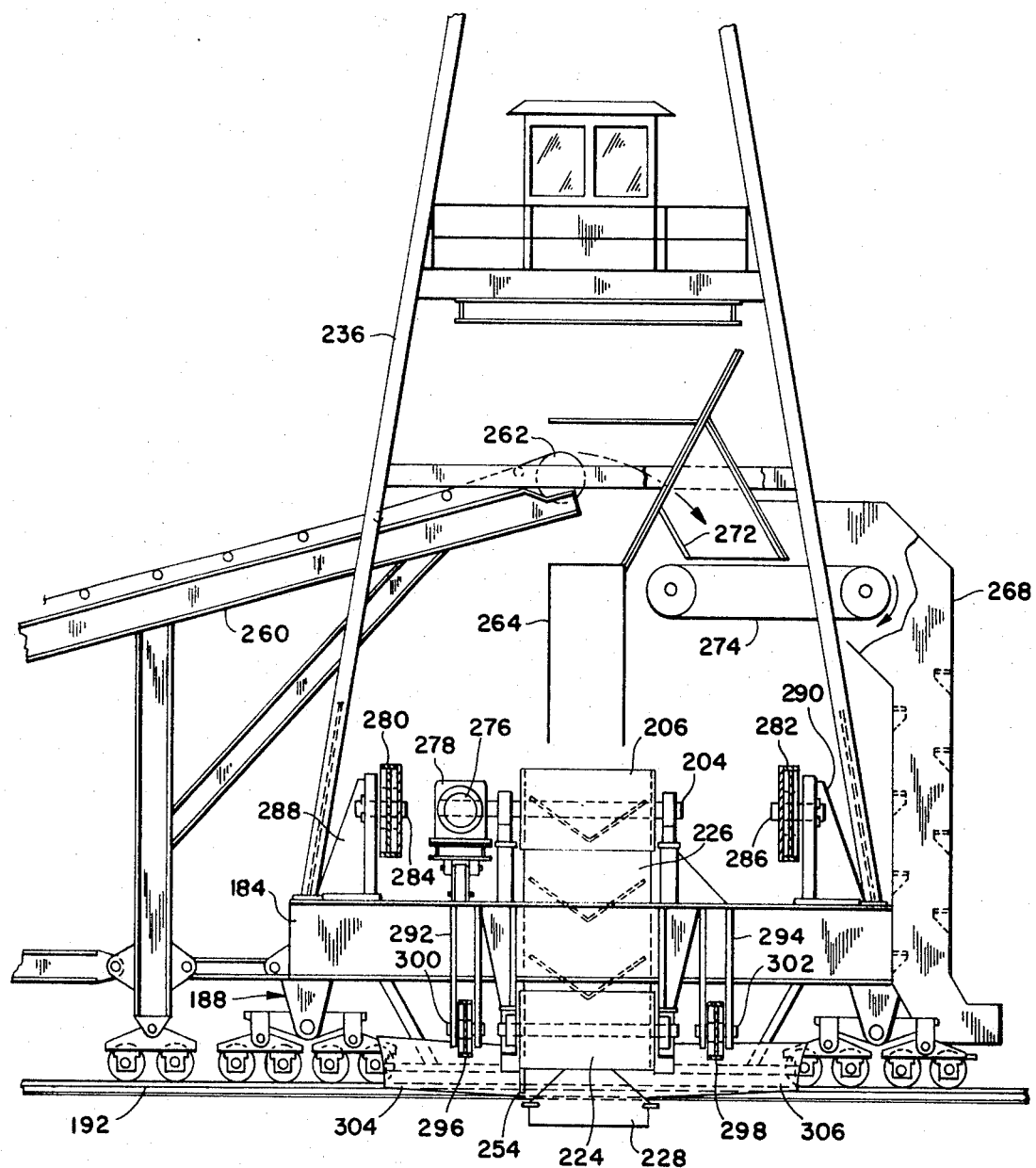

APPARATUS FOR STACKING AND RECLAIMING BULK MATERIAL

BACKGROUND OF THE INVENTION AND PRIOR ART

In the handling of bulk materials such as coal, ore, sand, gravel, grain, and the like, large quantities of such materials are conveniently and temporarily stacked in piles with the aid of a traveling conveyor belt or series of conveyor belts. These conveyor belts accept the bulk material from transport vessels, such as railroad cars or ships, and deposit the material in such piles. In order to recover the material from temporary storage thereof, it has been customary to utilize a second piece of apparatus called a reclaimer, which traverses the length of the pile of stacked material and by means of an endless chain of raking flights drags the material down the side of the pile and into the mouth of a hopper which in turn deposits the material on a conveyor belt for distribution to awaiting transporation means, e.g. ships or railroad cars, or to a plant where the material is ultimately utilized.

I have previously described in my copending U.S. Pat. application Ser. No. 839,767 now U.S. Pat. No. 3,618,744 a stacker-reclaimer apparatus utilizing an endless conveyor belt in conjunction with an endless chain system supporting raking flights mounted on a single boom. In certain instances it is necessary to elevate reclaimed material from a point at or close to ground level to a height sufficient for discharge onto a conveyor belt supported from ground level. In the prior art structures, this involved an articulated boom and a reverse bend in the upper reach of the conveyor belt and the reclaiming rake supporting chain system. With the development of endless belt systems in which V-shaped flights operative for both stacking and reclaiming operations are secured directly to the conveyor belt, coursing through a reverse bend in an articulated boom presents difficulties, not the least of which is undue wear on the belt. Complicated flight design involving relatively slidable panels or flexible panels may be necessitated to accommodate such a reverse bend.

The present invention solves this problem by eliminating any reverse bends in a way which preserves simple and effective flight design and provides an effective stacking and reclaiming apparatus. In the present device, whenever the belt undergoes a change in direction, the apexes of the flights move away from the belt surface rather than toward or into the belt surface.

BRIEF DESCRIPTION OF THE DRAWINGS

The invention will be better understood by having reference to the annexed drawings which show embodiments of the present invention in stacking and reclaiming apparatus useful in stacking bulk material in a linear or a circular storage pile and reclaiming material from said pile, and wherein:

FIG. 1 is a side elevation of one embodiment showing a single four-link boom mounted on a rotatable frame and utilizing a hydraulic ram coacting with a fifth link to effect movement in a vertical plane.

FIG. 2 is a fragmentary section showing the apparatus of FIG. 1 as it appears in the plane indicated by the line 2—2 in FIG. 1.

DETAILED DESCRIPTION OF THE DRAWINGS

Figure 3:
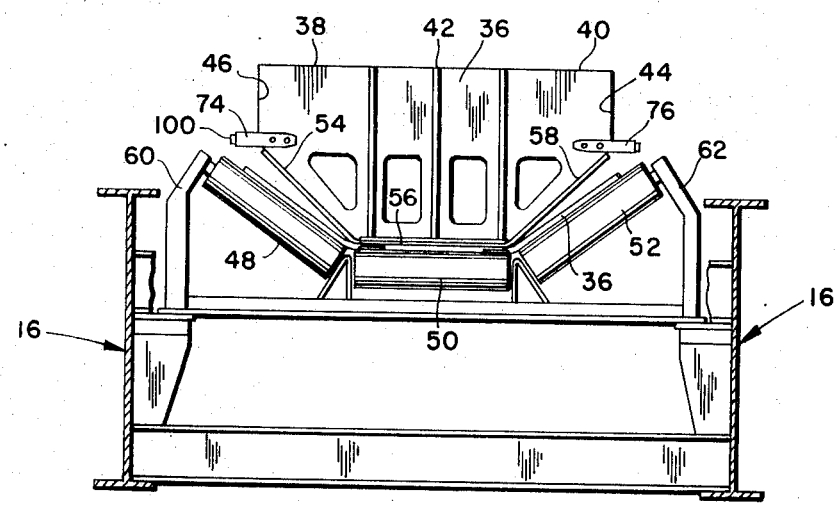
FIG. 3 is a sectional view on an enlarged scale through the upper course or reach of the boom of FIG. 1 as it appears in the plane indicated by the line 3—3 in FIG. 1.

Referring now more particularly to FIGS. 1 and 2, there is here shown one embodiment of the present invention utilizing a single four-link boom mounted on a frame which is in turn mounted for rotation through 360° on a circular track 9. The frame structure, being of conventional design and adaptation, is not shown in detail in FIGS. 1 and 2. The essential part of the novel structure is in the four-link boom structure.

Accordingly, there is provided a supporting frame generally and partially shown and indicated at 10 serving to support a four-link boom generally indicated at 12. The boom 12 is composed of a first link 14 suitably mounted in a frame partially shown at 10. A second link 16 is pivotally secured to the first link 14 on the axis 18 and provides an upper reach 20 for the boom structure. A third link 22 is pivotally secured on the axis 24 to the outer or distal extremity of the second link 16. A fourth link 26 is pivotally secured to the third link 22 on the axis 28, and the geometric figure closed by the attachment of the fourth link 26 to the first link 14 on the axis 30. In the embodiment shown in FIGS. 1 and 2, the geometric figure is an irregular trapezoid, no side of which is equal to any other side. This is a convenient configuration, it being understood that other four-sided configurations, e.g. regular trapezoid or rectangular, may be used. The first, second, third and fourth links define an outer periphery 32 along which courses an endless conveyor belt 34 having a plurality of flights 36 secured to and spaced along the belt 34.

The endless conveyor belt 34 is conveniently a wire cable, woven nylon fabric reinforced rubber belt which is commercially available. The belt may have any convenient untroughed width, that in the preferred illustrated embodiment being approximately 7 feet.

Figure 4:
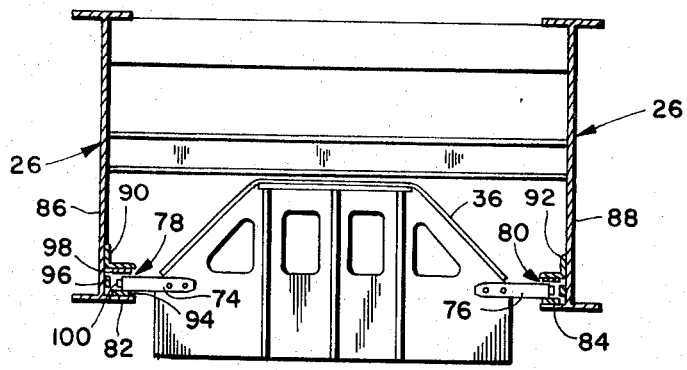
FIG. 4 is also a sectional view on an enlarged scale through a lower, reclaiming course or reach of the boom of FIG. 1 as it appears in the plane indicated by the line 4—4 in FIG. 1.
Figure 5:
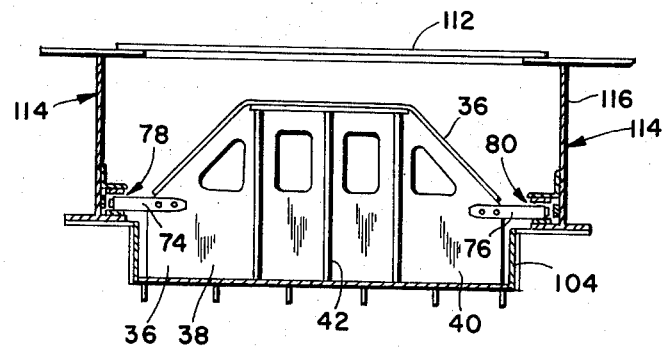
FIG. 5 is also a sectional view on an enlarged scale through a lower, return course or reach of the boom of FIG. 1 showing the reclaiming chute with a flight in course therethrough as it appears in the plane indicated by the line 5—5 in FIG. 1.

The flights are conveniently built-up structures of steel plates such as shown in FIGS. 3 – 5 inclusive and project outwardly from the outer surface of the belt. The flights 36 are also cupped, or as shown, the sidewalls 38 and 40 are constructed to diverge from an apex 42, the apex 42 being conveniently formed either by bending or by welding the sidewall plates 38 and 40 along abutting edges. In operation, the endless belt 34 moves in a clockwise direction about the periphery 32 of the irregular trapezoid defined by the four-link boom 12. Thus, the apexes 42 of the flights 36 trail the leading edges thereof, such as leading edges 44 and 46 (FIG. 3).

The flights 36 are secured to the reinforced rubber conveyor belt by any suitable clamping means, preferably utilizing the structural strength imparted by the wire cables embedded in the body of the rubber belt as an anchor for the flights. The design of the flights 36 and the mode of anchoring them to the belt form no part of the present invention except to the extent that the endless conveyor belt includes flights directly associated therewith.

In the embodiment shown in FIGS. 1 and 2, the capacity of the endless conveyor belt 34 is increased by means of troughing rolls such as rolls 48, 50, and 52 as shown in FIG. 3. The troughing rolls are of conventional structure and design well known in the conveyor belt art. As is best shown in FIGS. 3 – 5, because of the troughing effect of side idler rollers 48 and 52, for example, the lower marginal edges 54, 56, and 58 of the flight 36 are contoured to accommodate the troughing effect imposed by the rollers 48 and 52. The lower marginal edge 56 is flat since it rests on that portion of the belt 36 which traverses horizontally disposed rollers. The reinforcing cables in such a conveyor belt 34 which are used for anchoring the flights 36 thereto are, therefore, disposed in underlying relation to the lower marginal edge 56 of the flight 36. It will be appreciated that as the belt courses around pulleys at the pivotal connections between the first, second, third and fourth links, it undergoes a change from a troughed cross-sectional contour to a flat contour. Accordingly, anchoring of the flights to the belt 36 cannot be achieved along the raked lower marginal edges 54 and 58.

The upper side of the second link 16 is, therefore, fitted with suitable bracket means such as brackets 60 and 62 for supporting troughing rollers on which the belt 34 is caused to ride. This upper course or reach of the second link 16 thus becomes the means for elevating bulk material from the proximal extremity 64 of the second link 16 upwardly and outwardly to the distal extremity 66 where, because of reversal of direction around a head pulley 68, the bulk material is cascaded onto a storage pile 70 in a known manner. Thus, the second link 16 may be described by its function, namely, a stacking link 16. The belt 34 with the flights 36 attached thereto then courses along the third link 22 which, for the purposes of this invention, may be defined as a floating link 22. A pulley 72 is mounted for rotation on the axis 28 and guides the endless belt 34 onto the fourth link 26. It will be observed in FIG. 1 that the third or floating link 22 is relatively short. The fourth link 26 is relatively long and of somewhat reinforced structure as it defines a lower reach of the four-link boom 12. Along the lower surface of the relatively longer fourth link 26, the outwardly projecting flights 36 may be brought into raking contact with the surface of the pile 70 whereby bulk material is dragged along the surface downwardly toward the pivot point 30 between the fourth link 26 and the first link 14. Accordingly, the fourth link 26 may be further defined by its function, i.e., a reclaiming link, whereby bulk material is reclaimed from a storage pile.

It is a standard operating procedure in reclaiming bulk material from a storage pile that as the rakes (in this case the flights 36) move downwardly along the lower reach of a reclaiming boom (in this case the fourth link 26), they also traverse laterally along the side of the storage pile so that the resultant movement of any flight or rake 36 is diagonally downwardly and laterally along the surface of the active pile. In the embodiment shown in FIGS. 1 and 2, the lateral component of movement of the flights 36 would be effected by rotation of the supporting frame 10 in either direction as shown by the arrows in FIG. 2. In the case of a linear pile of material, the lateral component of movement of the flights 36 would be effected by the translation of the reclaiming boom along a parallel trackway.

The lateral component of movement introduces lateral forces upon the flights 36, and to stabilize the apparatus from such lateral thrust forces, there are provided thrust bars 74 and 76 which project laterally beyond the leading edges 46 and 44, respectively, as shown in FIG. 3. While these stabilizing bars 74 and 76 serve no function during the stacking operation, nevertheless during the reclaiming operation the bars 74 and 76 coact in guideways generally indicated at 78 and 80, respectively. The quideways 78 and 80 are channels formed from the inwardly projecting flange portions 82 and 84 of I-beams 86 and 88, respectively, and suitably spaced angle beams 90 and 92 secured to the web portion of I-beams 86 and 88 by any suitable means, e.g. welding. The combination of the flange portion 82, the web of I-beam 86 and the angle beam 90 defines a channel for guiding the projecting stabilizing bar 74. In like manner, the stabilizing bar 76 is also guided on the opposite side. The guideways 78 and 80 are suitably lined with wear-resistant bars, e.g. wear bars 94, 96 and 98. A hardened steel tip 100 may be provided to prolong the life of the stabilizer bar 74. A corresponding tip is provided for bar 76. These guideways 78 and 80, for example, are suitably lubricated to minimize wear. It will be observed, therefore, that any lateral thrust tending to move the flight 36 to the right or to the left as shown in FIGS. 4 and 5 will be resisted by the guideways 78 and 80.

The lower end of the reclaiming link 26 is disposed so that the flights in coursing around the pulley 102 rotating on the axis 30 closely approach the ground level. This positioning of the pivot axis 30 joining the reclaim boom 26 and the first or return link 14 ensures that, when the boom is lowered to the position shown in dotted lines FIG. 1, a maximum amount of bulk material may be reclaimed from the storage pile 70. As the endless belt 34 courses around the pulley 102, it enters an elevating portion along the underside of the first link 14. In this region of the fourlink boom 12, bulk material is carried from the ground level upwardly along a chute 104 best shown in cross-section in FIG. 5. The discharge extremity of the chute 104 is provided with a hopper fitting 106 for cascading reclaimed material onto a conveyor belt 108 supported in the frame 10 which serves to carry reclaimed material away from the apparatus to any desired point. In order to prevent material spilled from the upper reach during stacking operations from falling onto and being carried by the underside of the belt 36 into the driving pulley 110, there may be provided a cover plate 112 to shroud in combination with the side members 114 and 116 the link 14. The drive pulley 110 is mounted on the axis 18 which passes through the pivotal juncture of the first and second links of the four-link boom 12. Any suitable means for driving the drive pulley 110 may be used, numerous conventional structures being known to those skilled in the art.

In order to supply bulk material to the upper reach 20 of the stacking link 16, there may be provided a tripper generally indicated at 118 including a conveying belt 120 having its discharge extremity 122 adapted to cascade bulk material into a hopper 124. Hopper 124 communicates in turn with loading chute 126 or by-pass chute 128. A suitable flop gate generally indicated at 130 controls the flow of material through the chutes 126 and 128. The chute 128 discharges bulk material onto the return conveyor belt 108, by-passing the entire stacking operation. An operator's control booth 132 is conveniently located and supported by the frame partially shown at 10 to enable visibility of the equipment and the material being handled.

During reclaiming and as the pile of bulk material is worn down during reclamation, it is necessary to lower the fourlink boom structure from the stacking position shown in solid lines in FIG. 1 to the ultimate reclaiming position shown in dotted lines in FIG. 1. One form of causing movement of the four-link boom in a vertical plane is shown in FIG. 1 and comprises a fifth link 134 pivotally secured at one end and provided with a roller 136 at its opposite extremity adapted for coaction with a rail 138 mounted on the underside of the second link 16. In the embodiment shown, the lower extremity of the elevating link 134 is pivotally mounted on the axis 30 although the shafts 140 and 142 are separate from the shaft which supports the pulley 102. The link 134 is bifurcated to provide support arms 144 and 146 which span the underlying endless belt 34 and do not interfere with its operation. The arms 144 and 146 are pivotally mounted for rotation on shafts 140 and 142, respectively. As indicated, the upper end of the link 134 is provided with a roller 136 mounted for rotation on bearing members such as the bearing member 148. A ball screw jack 150 of relatively long stroke is mounted as by suitable brackets 152 and 154 along the underside of the second link 16. The extensible rod 156 extending from the cylinder 158 is joined to the bearing member 148. By movement of the rod 156, the roller bearing end of the link 134 may be reciprocated back and forth along the rail 138, thereby changing the distance between the second link 16 and the axis 30 and effecting movement of the pivotally interconnected links in a vertical plane. Instead of a ball screw jack assembly 158, there may be employed an hydraulic cylinder. The link 14 is desirably fixed in relation to the frame 10. The outer end is supported in a carriage 160 which is provided with two-wheeled trucks 162 and 164 to enable movement along the circular trackway 9. Mounting brackets 166 and 168 support the shaft 142 on which the link 134 is pivotally mounted. These brackets extend from the forward crosshead 170. In like manner brackets 172 and 174 support shaft 140 for the opposite arm 144 of the link 134. The first link 14 is generally fixed in the frame 10 and does not in normal operation undergo movement in the vertical plane in which movable links 16, 22 and 26 move.

Where the endless belt 34 and the flights 36 course around drive pulley 110, a shroud 176 is conveniently provided to enable bulk material to be carried around the drive pulley for deposition on the upper surface of the belt 34 and return to the stack or pile 70.

In operation, the apparatus shown in FIGS. 1 and 2 during a stacking operation receives bulk material from the tripper 118 which is cascaded through the hopper 124 and the chute 126 onto the upper reach of the endless belt 34 and between flights 36 outwardly projecting therefrom. For the stacking operation, the fifth link 134 has elevated the stacking link 16 to a predetermined elevation. As material is loaded onto the conveyor belt, the apparatus may be continuously or intermittently revolved on circular trackway 9 to effect the stacking of bulk material into a circular pile of triangular cross-section. In the reclaiming operation, the conveyor belt 108 is actuated, and the four-link boom 12 lowered by extension of the arm 156 so that the flights 36 coursing along the lower reclaiming boom 26 engage the surface of the pile of bulk material 70. Simultaneously, the apparatus is rotated slowly along the circular trackway 9 and material removed from the surface of the pile 70 conveyed downwardly along the face of the pile around the pulley 102 and into the reclaiming chute 104 for ultimate discharge through the hopper 106 onto the reclaim conveyor belt 108. As the pile is worn away, the arm 156 is extended further to cause lowering of the four-link boom 12 ultimately to the position shown in dotted lines in FIG. 1.

What is claimed is:

1. A stacker-reclaimer apparatus comprising in combination:
   a. a frame,
   b. a four-link boom having upper and lower reaches and having a first link normally stationarily mounted in the frame and having consecutively pivotally joined second, third and fourth links movable in a vertical plane relative to the frame, the free ends of the second and fourth links being pivotally joined to the first link,
   c. means for producing rotation in said plane of one link relative to its adjacent link, including a fifth link secured adjacent a pivot joining any two of said first link, second link, third link or fourth link and extending to and movable along and in contact with an opposite link, and means coacting therewith to change the distance between the opposite link and the pivot, and
   d. endless belt means including a plurality of upstanding outwardly projecting flights spaced therealong mounted on said boom for continuous coursing along the outer periphery defined by said first, second, third and fourth links.

2. A stacker-reclaimer in accordance with claim 1 wherein the first link is stationarily mounted relative to said frame.

3. A stacker-reclaimer in accordance with claim 1 wherein the frame is mounted on wheeled trucks for movement on a trackway.

4. A stacker-reclaimer in accordance with claim 3 wherein the trackway is linear.

5. A stacker-reclaimer in accordance with claim 3 wherein the trackway is circular.

6. A stacker-reclaimer in accordance with claim 1 in which the distance-changing means includes a ball screw jack coacting with the fifth link.

7. A stacker-reclaimer in accordance with claim 6 in which the ball screw jack is secured to the opposite link and coacts with the free end of the fifth link.

8. A stacker-reclaimer in accordance with claim 1 in which the fifth link is pivotally secured at one end on the same axis as said pivot and is provided with a roller at its free end, and the opposite link includes an elongated guideway extending therealong for guiding the free end of said fifth link as it moves in response to said ball screw jack.

9. A stacker-reclaimer in accordance with claim 1 additionally including conveyor means for feeding bulk material to be stacked to an upper reach of said endless belt.

10. A stacker-reclaimer in accordance with claim 1 additionally including a return chute coacting between the first link and a lower reach of said endless belt, said return including a discharge chute, and a reclaimed material conveyor for conveying reclaimed material away from said stacker-reclaimer disposed in material-receiving relation to said discharge chute.

11. A stacker-reclaimer in accordance with claim 1 in which the fourth link is adapted to be moved in said vertical plane for reclaiming bulk material from a pile.

12. A stacker-reclaimer in accordance with claim 11 in which the lower side of said fourth link includes means coacting between said fourth link and said endless belt means for stabilizing said endless belt means against lateral thrust forces.

13. A stacker-reclaimer in accordance with claim 1 in which the endless belt means includes a wire cable reinforced rubber belt and clamping means coacting between the belt and the flights for anchoring the latter thereto.

14. A stacker-reclaimer in accordance with claim 1 in which the endless belt means includes troughing rollers disposed along the upper reach of said boom.

* * * * *